3,104,528
POWER VEHICLE WITH HYDROSTATIC POWER TRANSMISSION TO MOTIVE AND OPERATING DRIVES
Martin Hörig, Aschaffenburg, Germany, assignor to Gesellschaft fur Linde's Eismaschinen Aktiengesellschaft, Hollriegelskreuth, near Munich, Germany, a company of Germany
Filed Sept. 1, 1960, Ser. No. 66,371
Claims priority, application Germany Sept. 8, 1959
3 Claims. (Cl. 60—52)

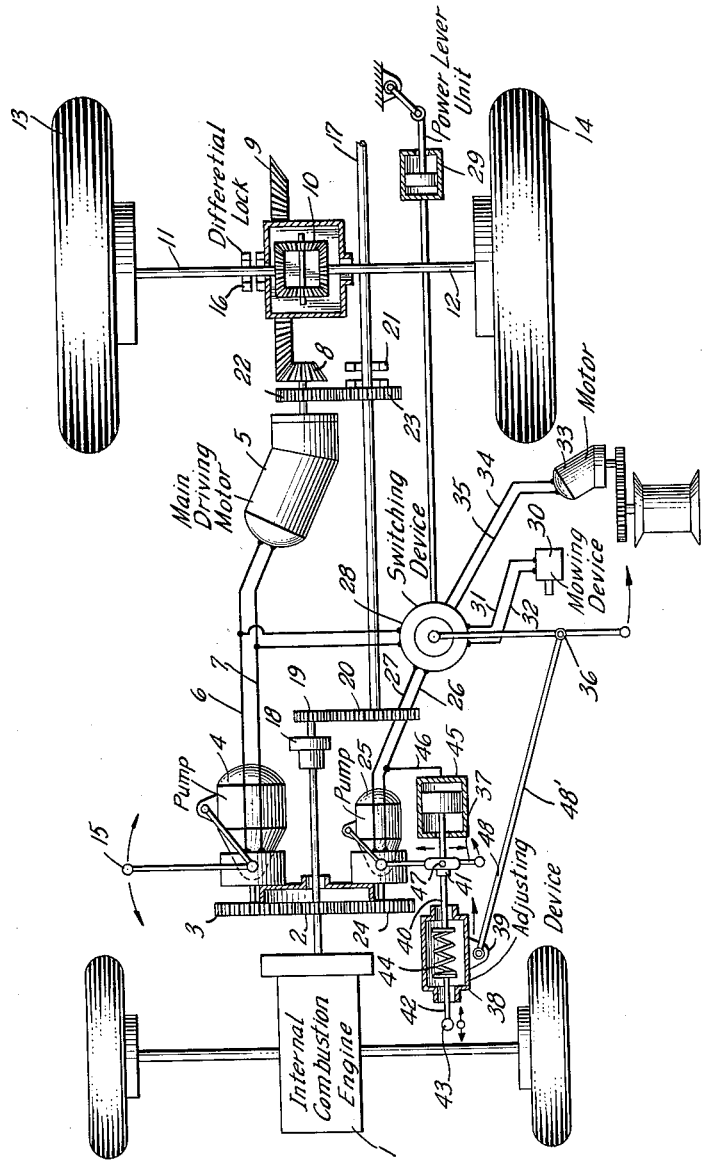

This invention relates to the wheeled vehicle art, and is concerned with improvements in hydrostatic power transmission to the motive and operating drives of such vehicles.

Tractors and implement-carriers are known, especially in agriculture, in which an internal combustion engine drives two pumps of a hydrostatic power transmission, one of which pumps advances a hydrostatic motor for the motive drive, while the other pump feeds hydrostatic motors for the operation of working implements. These vehicles are usually so equipped that either a (motive) motor acts directly on the drive wheels of the vehicle or one motor drives the drive wheels directly while a conversion drive for changing the torque and r.p.m. between motor and drive wheel lies within the frame of the direct drive. The operation or auxiliary drive can logically be driven by a hydraulic motor, which is fed by the other pump, through various mechanical gear connections, or several hydraulic motors and cylinders are provided which can be connected at will into the hydraulic power flow, through a hydraulic control device. Usually in the cases of agricultural vehicles, the drive for working equipment is needed only within a lower speed range of the vehicle, while in higher speed ranges a drive for implements is no longer provided.

Therefore it has been suggested that the gross output for the upper speed ranges of the vehicle be supplied both by the pump of the motive drive and additionally by the other pump. In principle, it is the same in the present problem if, instead of one hydrostatic pump and one hydrostatic motor, two or more are provided.

The hydrostatic pumps suitable for this purpose have a wide range of output, which can be regulated, preferably continuously (step-less), from a minimum to a maximum amount, of which the minimum may be zero or the maximum amount may be delivered in both directions, so that the drive is reversible. The variation of the output of these pumps is attained by mechanical means. The adjustment of this mechanical means requires a certain, directed power effect. As a rule, the adjustment-effecting force increases with the output, while in the zero position no power effect is necessary. The force for the adjustment of the output is opposed by the reaction or return forces from the hydraulic side of the pump, of which the magnitude usually increases with the hydraulic pressure.

Since the hydrostatic pressure in the hydraulic system usually depends on the amounts of mechanical resistance in the drive and could, with increasing resistance, become greater than allowable, over-pressure or safety valves are built in by which the excess output can escape, so that the hydraulic pressure cannot exceed a certain, preferably adjustable, maximum pressure. This arrangement may, according to its purpose and its design, involve great losses, since the energy to be applied is proportional to the amount and pressure of the output, while the energy utilized corresponds only to the output absorbed and its pressure. This is true, for example, in units which lift a load within a certain time and then must hold it suspended. During the lifting an advancing amount and pressure of feed, and thus an advancing capacity, is required, while during the holding in the suspension position, only a hydraulic pressure is necessary, the advancing amount only having to compensate possible relaxation losses, and thus being very slight.

There are arrangements, however, in which the drive resistance may vary between rather wide limits even during one operation process; thus, for example, when during an operation process or program the applied moment of a load lies at variable effective lifting arm lengths or if, for example, motive resistances on a roadway of different characteristics are to be overcome.

This invention relates to such a power vehicle, especially for agriculture, construction and industry, with hydrostatic power transmission to motive and operation gears, comprising at least two pumps and motors driven by an internal combustion engine as power source, in which within lower vehicle speed ranges at least one pump can act on the motive drive or drives and at least one other on the operation drive, and in the upper speed ranges at least one of the other pumps can additionally feed the motive drive or drives, with the distinction that the adjusting forces to be exerted (in the adjustment of the output of at least one of the pumps which can act, through at least one control element, on the operating and motive drives) can be elastically retarded. The adjusting force acting mechanically on at least one of the pumps for the operation drive should, accordingly, be elastically retardable, for example, be overcome by reaction or return forces, so that the output is diminished in accordance with the withdrawal. These forces should, however, also return to the original output setting with a lessening of the reaction or return forces. If, for example, two or more operation gears of different characteristics are driven by one pump and one control element is used to select the gears to be set in operation, then it is advisable for the adjustment forces to be adjustable (variably set) by the control element, according to the desired output wanted. In this way, the amount and pressure of feed ideally given to the drive are predetermined and can be reduced on exceeding certain values. Since the control device can be set on the various drives, it is advisable that the variable setting of the adjusting forces be undertaken in combination with the adjustment of this control device, for example, by a simple mechanical connection. Rather than depend exclusively on the effect of reaction or return forces, which occur through the type of construction, it is advisable to provide a counter-force device which can partly or wholly cut off the output at a maximum pressure exceeding that prescribed for the drive in question, which may overcome the force of the feed setting. This counter-force device, which may, for example, consist of a hydraulic cylinder with appropriate transmission to the pump, can likewise be adjusted to advantage, in combination with the control device. This connection may be of a purely mechanical sort or be of the hydraulic sort. For maintaining great efficiency it is advantageous if the responsive pressure of the counter-force device lies below the overload level of the safety valve or valves. Especially good relations are achieved when the combined action of power setting device and counter-force device can be set at a feed amount automatically not exceeding a certain pressure with variable work loads and thus using the best capacity of the internal combustion engine. To utilize fully the advantages of variable setting and counter-force devices and thus to be able to equip the power vehicle with the drives of greatest capacity, it is advantageous—and even in cases of temporary overstrain thoroughly profitable—that the sum of the maximum capacity of the pumps be greater than the maximum capacity of the energy source. In the working together of the one pump or pumps, it is advantageous if the cooperation of the setting force device and the counter-force device can be adjusted independently of the response of a capacity regulation on the first pump or pumps.

This invention will be further described, with reference to the accompanying drawing, in which the single FIGURE is a diagrammatic representation of an organization embodying the principles of the present invention.

The drawing shows in diagram an example of the design or use of the subject of this invention on a tractor or implement carrier, especially for agriculture. By means of an internal combustion engine 1 a hydraulic power transmission is activated through meshing gears 2 and 3 for the motive drive, which consists of a pump 4, a motor 5, two conduits 6 and 7 lying between pump 4 and motor 5, a bevel gear combination 8 and 9, a compensating gear 10, two semi-axles 11 and 12 and two drive wheels 13 and 14. The output of pump 4 is continuously regulated through lever 15 from zero to maximum values in both directions. The turning direction of drive wheels 13 and 14 is determined by the tilt of pump 4. A differential lock 16 can bind the two axle halves 11 and 12 rigidly together. The tractor is equipped with a shaft 17 which can be driven, dependent on direction, either by a coupling 18 and gearing 19, 20 from the internal combustion engine 1, or by coupling 21 and gearing 22 and 23 of motor 5, in the usual way.

With gear 2 there is engaged, also, a further gear 24 by which latter a second pump 25 is driven. This pump 25 belongs to a second hydrostatic power transmission which leads through conduits 26 and 27 to a reversing, changeover or switching element or device 28 and can be transmitted further to the various operating equipment as well as to hydrostatic power transmission for the motive drive.

As operated devices there are represented a power lever unit 29, a mowing device 30, which is connected through conduits 31 and 32 with the switching element 28, and cable winding drive 33, to which latter conduits 34 and 35 lead from the switching element 28. The switching element 28 is activated by lever 36. A lever 37 is used to adjust the tilting of pump 25, thus regulating the output of the pump. An adjusting device according to this invention engages with pump 25, and consists of a can (cage) 38 with a point of application 39, a thrust rod 40 with a point of application 41, which is connected with pump 25, a thrust rod 42 with a point of application 43 and a spring 44 lying between the two thrust rods 40 and 42.

A counter-force device is also provided which consists of a hydraulic cylinder 45, a feed line 46 and a point of application 47. The line 46 is connected with pressure line 26 and the point of application 47 is so connected with the pump 25 that conversion can be adjusted, for example, by varying the effective length of the lever.

To produce a flow of power from the pump 25 to an operated device 29, 30, 33 the control element 28 can be brought, by means of the lever 36, into the proper position and the pump 25 brought to feed capacity by lever 37. It is better and simpler however, if by means of the lever 36 (through a connection rod 48', articulated, on the one hand, on lever 36 at point 36' and, on the other hand on fulcrum 39, with, if desired, possible variation of the point of application 43), the spring cage 44 also, and perhaps the thrust rod 42 are so moved in the arrow direction 48 that the pump 25 is adjusted by the thrust rod 40 to the output wanted. Thus, the hydraulic power or energy transmission is effected by moving a lever.

The output of the pump 25 flows through the conduit 26 to the cable-winding drive and from the drive returns through conduit 27 to the pump 25. Thus, in the conduit 26 a feed pressure prevails which is transmitted through conduit 46 into the hydraulic cylinder 45, where a counter-force is produced.

As long as the feed pressure does not exceed the set operation pressure, the counter-force cannot overcome the tension of spring 44, and the feed setting of pump 25 remains unchanged. However if, for one of the usual reasons, the feed pressure exceeds the allowable set working pressure by a certain amount—which may be adjusted—then the counter-force overcomes the tension of spring 44 and the lever 37 for the adjustment of the output is set back, without changing the position of the cage 38, in such manner that the output is decreased, so that in some of the usual cases the pressure is decreased to about the operation pressure. In the somewhat different case of an operation program, at any rate, the overpressure is stopped until the pump feed goes to zero, that is, until lever 37 goes all the way back. Both these processes are carried out by the arrangement shown. Since under some circumstances of different drives, different feed amounts at a different presusre are to be delivered by pump 25, the feed settings can best be varied according to the position of the control element, and also the original tension of the spring 44 can be varied by thrust rod 42 and by acting on the point of application 43 in each case according to the desired characteristics. The counter-force device, through hydraulic cylinder 45, is also made variable by the possibility of moving the point of application 47 in the slide member of the lever 37.

In this way there are provided the different feed and working pressures for the different purposes in a power lifting unit 29, for example. If this power lift is used for the rather rapid lifting of operation implements, then a high working pressure is needed and in each case a certain feed amount according to the total transmission. In this case, therefore, the lever 37 with activation of lever 36 for the control element 28 can vary the pump 25 greatly; at the same time, however, the original tension of the spring 44 inside the cage 38 which is moved quite far in the arrow direction 48, must be correspondingly great. In the upper end position of the power lifter, the feed amount must be turned off; this takes place through the overpressure which builds up in the end position and sets back the pump 25 to act on the counterforce device. If, however, the power lifting unit is applied, in a conventional way, as a wheel pressure reinforcement of the drive wheels, it is only necessary to shift the weight of the implement partially on the power lifter and so on the hind axle, so that in this case the power lifter is only set in action with lower pressures with, in some cases, a very slight deflection. This is attained by another setting of the lever 36 on the control element 28, or by maintaining the setting of lever 36 and changing the position of the cage 38 and the original tension of spring 44 by a relative withdrawal of thrust rod 42 in suitable fashion. As long as this new setting is maintained, the wheel pressure reinforcement is effective.

In another case for example, in mowing machine drive 30, there may be a limiting or blocking of the mowing bar by a foreign body, which also leads to an increase of pressure in conduit 26, which acts on the counter-force device and in the combined action, already described, with the setting force device, the feed of the pump is shut off so that there results protection against a breaking of the mowing device or its gear. At another setting of the lever 36, the switching element 28 is so switched that the pump 25 adds its output into the hydraulic power transmission of the motive drive. This is particularly the case with upper speed ranges. If in this range the vehicle resistance is irregular, and the motive pump 4 is set at full feed, then by the effect of the setting power device and the counter-force device, a continuous (step-less) speed regulation in this range is dependent on the motive resistance, so that the highest possible utilization of the capacity of the internal combustion engine is attainable.

If the safety valves in the various power transmissions are set above the pressure which is necessary to let the counter-force device overcome the setting force device, these will normally never have to respond, and incidental losses in capacity will not occur. Quite generally, the arrangement according to this invention allows the highest possible utilization of the internal combustion power engine at an ideal efficiency.

The arrangement presented can be used to advantage also on working machines and vehicles with hydraulic power transmission devices, as used for example in construction work and in industry.

I claim:

1. Hydrostatic transmission for a vehicle with at least one secondary drive such as an apparatus carrier or a tractor with a pivot shaft, the transmission including a first pump and a second pump and at least two motors operatively connected with said two pumps, one motor being a main driving motor, which motors are connected with each other through pipe lines, both of said two pumps being driven by an internal combustion engine and said first pump being connected by one of said pipe lines with the main driving motor, a switching element being provided in the pipe line by which the second pump can be connected with the main driving motor or with another motor, characterized in that said second pump (25) which can be connected either with the main driving motor (5) or with another motor (33) is provided with a control element (37 to 47) for varying the operation of said second pump (25) in dependence on the pressure obtaining in said pipe lines (26, 27) in such a way that when a predetermined maximum pressure is exceeded said second pump (25) is regulated to a lower delivery rate, said hydrostatic transmission being further characterized in that different driving devices (30, 33) arbitrarily can be connected, by means of said switching element, with the regulatable second pump (25) provided with the control element (37 to 47), and wherein a lever (36) effecting reversal of the switching element (28) is connected with the adjusting device (39) of the control element (37 to 47).

2. Hydrostatic transmission for a vehicle with at least one secondary drive such as an apparatus carrier or a tractor with a pivot shaft, the transmission including a first pump and a second pump and at least two motors operatively connected with said two pumps, one motor being a main driving motor, which motors are connected with each other through pipe lines, both of said two pumps being driven by an internal combustion engine and said first pump being connected by one of said pipe lines with the main driving motor, a switching element being provided in the pipe line by which the second pump can be connected with the main driving motor or with another motor, characterized in that said second pump (25) which can be connected either with the main driving motor (5) or with another motor (33) is provided with a control element (37 to 47) for varying the operation of said second pump (25) in dependence on the pressure obtaining in said pipe lines (26, 27) in such a way that when a predetermined maximum pressure is exceeded said second pump (25) is regulated to a lower delivery rate, in which hydrostatic transmission the control device consists of an adjusting lever (37), a cylinder (45), and a piston sliding in said cylinder (45), said cylinder being connected with the said pipe line (26) of said second pump (25), and a spring (44), said piston being connected with a connecting rod which can be articulated by means of a slide bar (47) at any point of the crank that the spring (44) engages the adjusting lever (37) and in which the initial stress of the spring (44) is adjustable.

3. Transmission according to claim 1, in which the main driving motor is fed by said first pump and constitutes the driving element connected to said second pump, and in which the volumetric capacity of the main driving motor is such as to accept whatever liquid volume is supplied to it by said second pump.

References Cited in the file of this patent

UNITED STATES PATENTS

| 2,103,530 | Henry | Dec. 28, 1937 |
| 2,238,060 | Kendrick | Apr. 15, 1941 |
| 2,745,253 | Towler et al. | May 15, 1956 |
| 2,955,917 | Roberts et al. | Oct. 11, 1960 |

FOREIGN PATENTS

| 412,816 | Germany | Mar. 23, 1922 |